United States Patent [19]
Goodrich et al.

[11] 3,932,555
[45] Jan. 13, 1976

[54] SILICONE ELASTOMERS

[75] Inventors: John Eric Goodrich; Francis Gowland Hutchinson, both of Runcorn, England

[73] Assignee: Imperial Chemical Industries Limited, London, England

[22] Filed: July 16, 1973

[21] Appl. No.: 379,315

[30] Foreign Application Priority Data
July 31, 1972  United Kingdom............. 35637/72

[52] U.S. Cl. ............. 260/825; 260/827; 260/874; 260/885; 260/901
[51] Int. Cl.² ................. C08G 77/42; C08G 77/38
[58] Field of Search ........................... 260/827, 825

[56] References Cited
UNITED STATES PATENTS

| | | | |
|---|---|---|---|
| 3,417,161 | 12/1968 | Douds et al. | 260/827 |
| 3,627,836 | 12/1971 | Getson | 260/827 |
| 3,631,087 | 12/1971 | Lewis et al. | 260/827 |
| 3,661,816 | 5/1972 | Pepe et al. | 260/827 |

*Primary Examiner*—Wilbert J. Briggs, Sr.
*Attorney, Agent, or Firm*—Cushman, Darby & Cushman

[57] ABSTRACT

A reinforced silicone elastomer formed from 95% to 20% by weight of a cross-linkable poly(organo siloxane) and from 5% to 80% by weight of a polymerisable ethylenically unsaturated material by cross-linking a substantial proportion of the poly(organosiloxane) before a substantial proportion of the ethylenically unsaturated material is polymerised, the ethylenically unsaturated material subsequently being polymerised.

13 Claims, No Drawings

SILICONE ELASTOMERS

This invention relates to reinforced silicone elastomers.

Unreinforced silicone elastomers produced by cross-linking of a poly(organo siloxane) generally have only low mechanical strength, for example, low tensile strength and low tensile modulus. Increased strength may be imparted to such elastomers by incorporating reinforcing fillers into the elastomers. Suitable fillers include calcium carbonate, titanium dioxide, and silica, especially finely divided silica.

It has also been proposed to reinforce such silicone elastomers by incorporating polymeric materials into the elastomers, e.g. by polymerising an ethylenically unsaturated monomer in the presence of a poly(organo siloxane) to form a polymeric material grafted to the poly(organo siloxane) and subsequently cross-linking the poly(organo siloxane).

The present invention relates to reinforcement of silicone elastomers with polymeric materials, the reinforced silicone elastomer comprising a blend of from 95% to 20% by weight of cross-linked silicone elastomer and from 5% to 80% by weight of a polymeric material in which the reinforced silicone elastomer is formed from a composition comprising at least one cross-linkable poly(organo siloxane) and at least one polymerisable ethylenically unsaturated material, and in which a substantial proportion of the cross-linking of the poly (organo siloxane) is effected before a substantial proportion of the ethylenically unsaturated material is polymerised, the ethylenically unsaturated material subsequently being polymerised. The composition suitably contains at least one cross-linking agent reactive with the poly(organo siloxane).

We have found that the reinforced silicone elastomers of the present invention, in general, possess certain properties superior to the properties of reinforced silicone elastomers prepared from a similar composition but in which the cross-linking of the silicone elastomer and the polymerisation of the polymerisable material are effected simultaneously or in which the polymerisation of the polymerisable material is effected before cross-linking of the elastomer. For example, the reinforced silicone elastomers of the present invention possess superior mechanical properties, e.g. superior tensile strength and tensile modulus.

The poly(organo siloxane), which is preferably completely soluble in benzene, may have a structure comprising, and preferably consisting essentially of, repeat units of structure

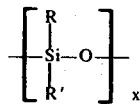

where R and R', which may be the same or different, are hydrocarbyl radicals or substituted hydrocarbyl radicals and $x$ is an integer. For example, R and R' may be selected from alkyl radicals e.g. methyl, ethyl, propyl, butyl and pentyl; aryl radicals, e.g. phenyl; aralkyl radicals, e.g. benzyl; alkaryl radicals, e.g. tolyl; alkenyl radicals e.g. vinyl, allyl and methallyl; and substituted alkyl radicals, e.g. chloromethyl, chloropropyl and trifluoropropyl.

Preferably both of the groups R and R' are hydrocarbyl groups and they may both suitably be alkyl groups especially methyl. Minor amounts of monoorganosiloxy units RSiO 3/2 may be present in the poly(organosiloxane).

The average molecular weight of the poly(organosiloxane) may vary widely, for example, from 20,000 to 500,000 or even greater but is preferably within the range 40,000 to 200,000. Poly(organo siloxanes) having molecular weights outside these ranges may be used if desired.

The polymeric material formed by polymerisation of the ethylenically unsaturated material preferably has a glass-rubber transition temperature of at least 25°C, more preferably at least 35°C, although we do not exclude the possibility of the polymeric material itself being an elastomer, that is, having a glass-rubber transition temperature below 25°C.

The polymeric material may suitably be formed by polymerisation of at least one ethylenically unsaturated monomer containing ethylenic unsaturation in a terminal group. Mixtures of such monomers may be used.

Suitable monomers inlcude, for example, vinyl esters, aromatic vinyl compounds, vinyl halides, vinylidene halides, and vinyl nitriles.

Suitable vinyl esters include, for example, vinyl acetate, and esters of acrylic acid having the structure $CH_2=CH-COOR^2$, where $R^2$ is an alkyl, aryl, alkaryl, aralkyl or cycloalkyl group. For example $R^2$ may be an alkyl group having from 1 to 20, and preferably 1 to 10 carbon atoms. Particular vinyl esters which may be mentioned include, for example, methyl acrylate, ethyl acrylate, n- and iso-propyl acrylates, and n-, iso and tertiary butyl acrylates.

Other suitable vinyl esters include, for example esters of the formula $CH_2=C(R^3)COOR^2$, where $R^3$ may be an alkyl group, e.q. methyl. In the ester of formula $CH_2=C(R^3)COOR^2$, $R^2$ and $R^3$ may be the same or different. Particular vinyl esters which may be used include, for example, methyl methacrylate, ethyl methacrylate, n-and isopropyl methacrylate and n-, iso- and tertiary-butyl methacrylate. Suitable aromatic vinyl compounds include, for example, styrene and derivatives thereof, e.g. α-alkyl derivatives of styrene, e.g. α-methyl styrene, and vinyl toluene.

The vinyl halide may be, for example, vinyl chloride, and the vinylidene halide may be, for example, vinylidene chloride.

Suitable vinyl nitriles include, for example, acrylonitrile and derivatives thereof, e.g. methacrylonitrile.

The ethylenically unsaturated material may include at least one polyfunctional ethylenically unsaturated monomer, that is, a monomer containing a plurality of ethylenically unsaturated groups. Suitable polyfunctional ethylenically unsaturated monomers include divinyl benzene, allyl acrylate, allyl methacrylate, triallyl cyanurate and esters of a glycol, for example, ethylene glycol, propylene glycol or glycerol, with an ethylenically unsaturated acid, for example, acrylic acid or methacrylic acid. A suitable such ester is ethylene glycol dimethacrylate. The polymeric material may be formed by polymerisation of a mixture of at least one monofunctional and at least one polyfunctional ethylenically unsaturated monomer.

The polymeric material may be formed from a mixture of at least one ethylenically unsaturated monomer and a polymer, for example, a polyester, containing a plurality of copolymerisable ethylenically unsaturated groups.

Polymerisation of ethylenically unsaturated monomer containing a plurality of ethylenically unsaturated groups alone or in admixture with a monofunctional ethylenically unsaturated monomer will lead to the production of a crosslinked polymeric material. Similarly, polymerisation of an ethylenically unsaturated monomer and a polymer containing a plurality of ethylenically unsaturated groups will lead to the production of a cross-linked polymeric material. It is preferred that the polymeric material is cross-linked as, in general, reinforced silicone elastomers containing such materials possess certain properties, e.g. tensile strengths and tensile moduli, superior to elastomers in which the polymeric material is not cross-linked.

The composition from which the reinforced silicone elastomer is produced is desirably homogeneous by which we mean that in the composition there is little if any phase separation visible to the unaided eye. Thus, we exclude gross phase separation in the composition although we do not exclude the possibility of the formation of some haziness therein.

In producing the reinforced silicone elastomer of the present invention the skilled man will readily be able to recognise how to effect cross-linking of the poly(organo siloxane) and polymerisation of the polymerisable material in such a way that a substantial proportion of the cross-linking of the poly(organo siloxane) is effected before a substantial proportion of the ethylenically unsaturated material is polymerised.

Thus, when the poly(organo siloxane) in the composition is cross-linked the composition changes from a material having a viscous, liquid, non-elastomeric consistency to a material which has elastomeric properties, that is, when the material is extended it recovers on release of the extending force. When the ethylenically unsaturated polymerisable material in the composition is polymerised the composition generally becomes opaque. In producing the reinforced silicone elastomer of the present invention the cross-linking of the poly(organo siloxane) should be effected at least to such an extent that the composition has an elastomeric consistency as hereinbefore described, and is preferably non-tacky, before polymerisation of the ethylenically unsaturated polymerisable material has proceeded to the extent that the composition has become opaque due to formation of the polymeric material. It is preferred that cross-linking of the poly(organo siloxane) should be effected substantially to completion before commencement of polymerisation of the polymerisable material.

In order that the cross-linking of the poly(organo siloxane) and polymerisation of the ethylenically unsaturated material may be effected in the manner hereinbefore described the cross-linking reaction and and polymerisation should be effected under different conditions. This difference in conditions may conveniently be a difference in temperature, that is, the cross-linking reaction and the polymerisation may conveniently be controlled by controlling the temperature. In a preferred method the cross-linking reaction is effected at a lower temperature than that at which the polymerisation is effected.

Thus, it is desirable that the cross-linking of the poly(organo siloxane) be effected at a relatively low temperature, e.g. at a temperature up to 50°C or even 60°C and preferably at or near ambient temperature.

Where cross-linking of the poly(organo siloxane) is to be effected by reaction with a cross-linking agent the cross-linking agent should possess two or more groups which will react with functional groups on the poly(organo siloxane). The poly(organo siloxane) should contain two or more such functional groups. Examples of such functional groups attached directly to silicon atoms in the poly(organo siloxane) include hydrogen, hydroxyl, alkoxy, e.g. methoxy, ethoxy and propoxy, alkenyl, e.g. vinyl and allyl, and acyloxy, e.g. acetoxy. Such functional groups may be attached to silicon atoms at the ends of the poly(organo siloxane) chain, or to in-chain silicon atoms, or to both types of silicon atoms. Suitably the poly(organo siloxane) may have one of the following general structures:

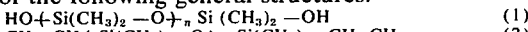  (1)
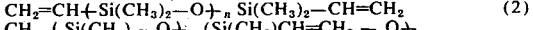  (2)
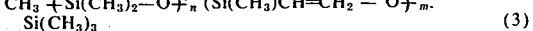
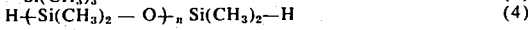  (3)
H$+$Si(CH$_3$)$_2$ — O$+_n$ Si(CH$_3$)$_2$—H      (4)

and

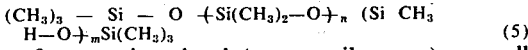  (5)

The aforementioned poly(organo siloxanes) are well known in the art. Poly(organo siloxanes) of types (1), (2) and (3) are preferred and the silanol-ended poly(dimethyl siloxane) of type (1) is the most preferred.

Suitable cross-linking agents reactive with hydroxyl groups attached directly to silicon, that is silanol groups, are well known in the art and are described, inter alia, in British Pat. Nos. 687,759; 764,246; 841,825; 844,128; 835,790; 851,578; 905,364; 975,603 and 999,123. Suitable cross-linking agents include alkyl silicates and alkyl polysilicates, e.g. methyl silicate, ethyl silicate, propyl silicate, butyl silicate and ethyl poly-silicate; methoxy ethyl silicate and amino ethyl silicate; trialkoxy silanes, e.g. methyl triethoxy silane and phenyl trimethoxy silane; triacyloxy silanes, e.g. methyl triacetoxy silane; methyl tris(benzamido) silane and methyl tris(butyl amino) silane. The preferred cross-linking agents are ethyl silicate, ethyl polysilicate and methoxy ethyl silicate.

The cross-linking reaction may be assisted by the presence in the composition of catalysts, e.g. bases or metal salts. Suitable bases include amines, especially primary amines. Where the catalyst is a metal salt metal salts of tin are preferred, although salts of other metals may be used. For example, the metal salt may be dibutyl tin dilaurate, tin naphthenate, lead octanoate, stannous octoate tin oleate and iron stearate.

Where the poly(organo siloxane) comprises a plurality of alkenyl groups, which may be terminal groups or which may alternatively or in addition be at least some of the groups R and/or R' on the silicon atoms in the chain of the poly(organo siloxane), the cross-linking agent may be a compound containing a plurality of groups reactive with the ethylenically unsaturated groups. For example, the cross-linking agent may be an alkyl hydrogeno polysiloxane, e.g. methyl hydrogeno polysiloxane and the catalyst may be, for example, chloroplatinic acid. The use of methyl hydrogeno siloxanes as cross-linking agent for alkenyl group containing poly(organo siloxanes) is described in British Pat. Nos. 1,027,051 and 1,289,217.

Other suitable combinations of poly(organo siloxane) and cross-linking agent include a poly(organo siloxane) containing halogenated hydrocarbon groups and an aminosilane cross-linking agent, and a poly(organo siloxane) containing hydroxyl groups and a cross-linking agent which is a siloxane having at least three units per molecule of formula R$^6$HSiO where R$^6$ is a monovalent hydrocarbon radical containing less than seven carbon atoms. The use of methyl hydrogenosiloxanes as cross-linking agent for silanol containing poly(organo siloxanes) is described in British Pat. Nos. 686,575; 804,199 and 841,825.

The cross-linking agent may suitably be present in the composition in a proportion of 0.1% to 20%, preferably 1% to 10% by weight of the poly(organo siloxane) in the composition. The most preferred proportion is from 1% to 5% by weight of cross-linking agent by weight of the poly(organo siloxane). Where a catalyst for the crosslinking reaction is used it may suitably be present in the composition in a proportion of 1% to 50%, preferably 10% to 30% by weight of the cross-linking agent in the composition. Proportions of cross-linking agent and catalyst outside the hereinbefore described ranges may be used if desired. For example, platinum catalyst may be effective in very small amounts of the order of parts per million.

Polymerisation of the ethylenically unsaturated material may be conveniently effected at a temperature higher than that at which the cross-linking is effected. The polymerisation temperature may suitably be greater than 50°C and preferably greater than 70°C. Onset of polymerisation may be delayed, if desired, by including in the composition suitable inhibiters for free radical polymerisation. The ethylenically unsaturated material may be polymerised by a free-radical generator. Suitable free-radical generators include peroxides e.g. dicumyl peroxide, cumene hydroperoxide, t-butyl hydroperoxide and di-t-butyl hydroperoxide, and peresters, e.g. t-butyl perbenzoate, isopropyl peroxycarbonate and t-butyl per-oxycarbonate. The free-radical generator may be azobisiso-butyronitrile.

The concentration of free-radical generator may suitably be in the range 0.1% to 10%, preferably 1% to 5% by weight of the ethylenically unsaturated polymerisable material in the composition, although concentrations outside this range may be used if desired.

In order that the polymeric material may have a substantial reinforcing effect in the silicone elastomer it is preferred that the reinforced silicone elastomer comprises at least 10% by weight of polymeric material, and more preferably that the reinforced silicone elastomer comprises from 75% to 50% by weight of cross-linked silicone elastomer and from 25% to 50% by weight of polymeric material.

The reinforced silicone elastomer may contain particulate filler material, e.g. glass, silica, quartz, titanium, dioxide, or ferric oxide, or fibrous filler material, e.g. glass fibre, carbon fibre or asbestos fibre, suitably in a proportion of up to 50% by weight of the reinforced silicone elastomer hereinbefore described.

This invention is now illustrated by the following Examples in which all parts are expressed as parts by weight.

EXAMPLE 1

A mixture of poly(dimethyl siloxane) of average molecular weight 100,000 containing an hydroxyl group attached to each of the terminal silicon atoms (200 parts) and methyl methacrylate (containing Topanol A) (150 parts) was vigorously stirred at room temperature (3 hours) to form a homogeneous mixture. Ethyl polysilicate (4.0 parts) ("ethyl Silicate 40"), dibutyl tin dilaurate (0.8 part), t-butyl peroctoate (0.76 part) and methyl methacrylate (10 parts) were added to the mixture. The resultant mixture was then stirred (0.25 hour) and n-butylamine (0.13 part) was added and stirring continued for 2 minutes. The mixture was then degassed at 50 mm pressure and poured into a mould consisting of a ⅛ inch thick polytetrafluoroethylene gasket on a 3/100 inch thick polytetrafluoroethylene sheet backed by a glass plate. The mould was sealed by placing a similar sheet and glass plate on the gasket, the glass plates were clamped, and the mould was heated in an upright position in an oven at 55°–60°C for 30 minutes after which time gelation had occurred and the poly(dimethyl) siloxane has been converted to a non-tacky elastomeric material. The mould was then heated at 72°C for 16 hours and finally at 130°C for 6 hours. The opaque elastomer had a tensile strength of 523 lb. in $^{-2}$ and an extension to break of 750%.

EXAMPLE 2

The procedure of Example 1 was followed to prepare two separate mixtures of poly(dimethyl siloxane) of molecular weight 125,000 and having terminal hydroxyl groups (60 parts), methyl methacrylate (40 parts), ethyl polysilicate (1.0 part), dibutyl tin dilaurate (0.2 part), and, in the first mixture, tertiary-butyl peroctoate (0.19 part) and n-butyl amine (0.05 part) and, in the second mixture, tertiary-butyl peroctoate (0.38 part).

The mixtures were degassed and charged to separate moulds following the procedure described in Example 1. The first mixture was allowed to stand overnight at room temperature to produce a non-tacky elastomeric material. Thereafter, the mould was heated at 70°C for 16 hours and at 130°C for 6 hours.

The resultant opaque elastomer had a tensile strength of 539 lb.sq.in$^{-1}$.

By way of comparison, the second mixture was charged to a mould preheated to 90°C and then heated directly at 90°C for 16 hours and 130°C for 6 hours. The cross-linking of the poly(organo siloxane) and polymerisation of the methyl methacrylate proceeded simultaneously.

The resultant opaque elastomer had a lower tensile strength, 459 lb.sq.in$^{-1}$.

EXAMPLE 3

A mixture of poly(dimethyl siloxane) molecular weight 300,000 containing a vinyl group attached to each of the terminal silicon atoms and 0.15 mole % of vinyl groups attached to silicon atoms in the macromolecular chain of the poly(dimethyl siloxane) (60 parts) and methyl methacrylate (dried over calcium hydride) (40 parts) were vigorously stirred under anhydrous conditions (1 hour). To the mixture there were added methyl hydrogenopolysiloxane of approximate general formula $(CH_3)_2 Si+O—SiCH_3H—O+_{50} Si(CH_3)_2$ (1.8 parts), chloroplatinic acid in isopropanol (25% w/v, 0.02 part), and t-butyl peroctoate (0.1 part) all of which had been degassed at room temperature for 30 minutes. The resultant homogeneous mixture was stirred for 5 minutes, degassed, and poured into a mould as used in Example 1 and heated at 70°C for 30 minutes until gelation had occurred to produce a non-tacky elastomer. The mould was then heated at 130°C for 6 hours. The resultant opaque elastomer had a tensile strength at break of 363 lb.in$^{-2}$ and an extension to break of 800%.

EXAMPLE 4

The procedure of Example 1 was followed except that 58.3 parts of poly(dimethyl siloxane) 1.25 parts of ethyl polysilicate, 0.17 part of dibutyl tin dilaurate and 0.033 part of n-butylamine were used, in place of the methyl methacrylate there was used 41.7 parts of n-butyl methcarylate and in place of the t-butyl peroctoate there was used 0.2 part of t-butyl perbenzoate, and the mould and contents were heated at 55°C to 60°C for 1 hour, 90°C for 16 hours and 130°C for 6 hours. The resultant opaque elastomer had a tensile strength of 320 lb.in$^{-2}$ and an extension to break of 250%.

EXAMPLE 5

In three separate experiments the procedure of Example 4 was followed to prepare elastomers from the following compositions.

| Experiment | A | B | C |
| --- | --- | --- | --- |
| poly(dimethyl siloxane) parts molecular weight 100,000. | 60 | 70 | 280 (molecular wt. 125,000) |
| Monomer. In place of n-butyl methacrylate of Example 4, parts | Styrene 40 | divinylbenzene 20, ethyl vinyl benzene 20. | Styrene 101.2 ethylene glycol dimethyacrylate 36 |
| Ethyl polysilicate parts | 1.9 | 2.8 | 11.2 |
| t-butyl perbenzoate, part | 0.19 | 0.14 | 0.56 |
| n-butylamine, part | — | — | 0.48 |
| dibutyl tin dilaurate part | 0.38 | 0.23 | 0.92 |
| water, part | 0.2 | — | — |

The heating procedure of Example 4 was followed except that in Experiment B the mould and contents were heated at 50°C for 30 minutes, 70°C for 16 hours and 130°C for 6 hours, and in Experiment C at 50°C for 30 minutes, 90°C for 18 hours and 130°C for 6 hours.

The properties of the resultant elastomers were as follows:

| Experiment | A | B | C |
| --- | --- | --- | --- |
| Tensile strength lb.sq.in$^{-1}$ | 432 | 854 | 590 |
| Extension to break% | 870 | 670 | 720 |

EXAMPLE 6

The procedure of Example 5B was followed in two separate experiments to prepare elastomers from the following compositions, the moulds and contents being heated at 50°C for 1 hour, 70°C for 18 hours and 130°C for 6 hours.

| Experiment | A | B |
| --- | --- | --- |
| poly(dimethyl siloxane) parts | 70 | 70 |
| molecular weight | 45,000 | 128,000 |
| divinyl benzene, parts | 15 | 15 |
| ethyl vinyl benzene. parts | 15 | 15 |
| ethyl polysilicate, parts | 2 | 4 |
| dibutyl tin dilaurate, part | 0.48 | 0.32 |
| t-butyl perbenzoate, part | 0.14 | 0.14 |
| b-butylamine, part | 0.08 | 0.024 |

The properties of the resultant elastomers were as follows:

| Experiment: | A | B |
| --- | --- | --- |
| Tensile strength lb.sq.in$^{-1}$ | 463 | 745 |
| Extension to break% | 440 | 590 |

EXAMPLE 7

The procedure of Example 5B was followed in three separate experiments to prepare elastomers from the following compositions

| Experiment | A | B | C |
| --- | --- | --- | --- |
| poly(dimethyl siloxane) molecular weight 100,000 parts | 100 | 100 | 100 |
| divinyl benzene, parts | 5.5 | 12.5 | 33.5 |
| ethyl vinyl benzene, parts | 5.5 | 12.5 | 33.5 |
| ethyl polysilicate | 4 | 4 | 5 |
| dibutyl tin dilaurate, part | 0.33 | 0.34 | 0.33 |
| t-butyl perbenzoate, part | 0.33 | 0.12 | 0.32 |
| n-butylamine, part | 0.044 | 0.06 | 0.067 |

The properties of the resultant elastomers were as follows:

| Experiment | A | B | C |
| --- | --- | --- | --- |
| Tensile strength lb.sq.in$^{-1}$ | 62 | 270 | 662 |
| Extension to break % | 230 | 440 | 490 |

EXAMPLE 8

The procedure of Example 1 was followed to prepare a mixture of 60 parts of poly(dimethyl siloxane) of molecular weight 125,00, 40 parts of methyl methacrylate, 1 part of ethyl orthosilicate, 0.2 part of dibutyl tin dilaurate, 0.19 part of t-butyl peroctoate and 0.032 part of n-butylamine. The mixture was degassed and charged to a mould and heated at 50°C for 1½ hours to effect cross-linking of the poly(dimethyl siloxane) and thereafter at 70°C for 16 hours and 130°C for 6 hours to polymerise the methyl methacrylate. The resultant elastomer had a tensile strength of 437 lb.sq.in$^{-1}$.

By way of comparison the above procedure was repeated except that the n-butylamine was omitted and the mould and contents were heated at 70°C for 16 hours and 130°C for 6 hours to effect simultananeous cross-linking of the poly(dimethyl siloxane) and polymerisation of the methyl methacrylate. In this case the tensile strength of the resultant elastomer was only 351 lb.sq.in$^{-1}$.

EXAMPLE 9

The procedure of Example 8 was followed to prepare an elastomer from 60 parts of poly(dimethyl siloxane) of molecular weight 45,000, 40 parts of methyl methacrylate, 1.7 parts of ethyl polysilicate, 0.41 part of dibutyl tin dilaurate, 0.1 part of azobisisobutyronitrile and 0.04 part of n-butylamine. The mixture was degassed and charged to a mould as used in Example 1 and was allowed to stand at room temperature for 16 hours in order to effect cross-linking of the poly(dimethyl siloxane). Thereafter, the mould and contents were heated at 70°C for 18 hours and 130°C for 6 hours to polymerise the methyl methacrylate.

The resultant elastomer had a tensile strength of 253 lb.sq.in$^{-1}$.

By way of comparison the above procedure was repeated except that 0.2 part of azobisisobutyronitrile was used, the n-butyl-amine was omitted, and the mould and contents were not allowed to stand at room temperature but were heated at 90°C for 18 hours and 130°C for 6 hours in order to effect simultaneous polymerisation of the methyl methacrylate and cross-linking of the poly(dimethyl siloxane). The resultant elastomer appeared non-homogenous when viewed by the naked eye and had a tensile strength of only 115 lb.sq.in$^{-1}$.

EXAMPLE 10

50 parts of a poly(dimethyl siloxane) of the type used in Example 3, 50 parts of methyl methacrylate, 1.5 parts of methyl hydrogenopolysiloxane, 0.02 part of a 25% w/v solution of chloroplatinic acid in isopropanol and 0.1 part of t-butyl peroctoate were mixed, degassed, charged to a mould and heated following the procedure described in Example 3. The resultant elastomer had a tensile strength of greater than 230 lb.sq.in$^{-1}$ and an extension to break of greater than 1000%.

EXAMPLE 11

The procedure of Example 10 was repeated except that 60 parts of the poly(dimethyl siloxane) having a molecular weight of 165,000 and containing 13.5 weight % of vinyl groups on the silicon atoms, 40 parts of methyl methacrylate, 1 part of methyl hydrogenopolysiloxane, 0.04 part of a 25% w/v solution of chloroplatinic acid in isopropanol and 0.19 part of t-butyl peroctoate were used. The mixture was degassed, charged to a mould, and heated at 50°C for 30 minutes to cross-link the poly(dimethyl siloxane) and was thereafter heated at 70°C for 18 hours and 130°C for 6 hours to polymerise the methyl methacrylate. The resultant elastomer had a tensile strength of 294 lb.sq.in$^{-1}$ and an extension to break of 60%.

What we claim is:

1. A reinforced silicone elastomer comprising a blend of from 95% to 20% by weight of cross-linked silicone elastomer and from 5% to 80% by weight of a polymeric material in which the reinforced silicone elastomer is formed from a composition comprising at least one cross-linkable poly(organo-siloxane) comprising repeat units having the structure

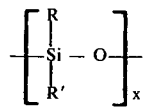

where x is an integer and the groups R and R', which may be the same or different, are hydrocarbyl radicals or substituted hydrocarbyl radicals, and at least one polymerisable ethylenically unsaturated material, and in which a substantial proportion of the cross-linking of the polyorganosiloxane is effected before a substantial proportion of the ethylenically unsaturated material is polymerised, the ethylenically unsaturated material subsequently being polymerised.

2. A reinforced silicone elastomer as claimed in claim 1 in which the composition contains at least one cross-linking agent reactive with the poly(organo siloxane).

3. A reinforced silicone elastomer as claimed in claim 1 in which the groups R and R' are both alkyl.

4. A reinforced silicone elastomer as claimed in claim 3 in which the groups R and R' are both methyl.

5. A reinforced silicone elastomer as claimed in claim 1 in which the poly(organo siloxane) has a molecular weight in the range 40,000 to 200,000.

6. A reinforced silicone elastomer as claimed in claim 1 in which the ethylenically unsaturated material comprises at least one ethylenically unsaturated monomer.

7. A reinforced silicone elastomer as claimed in claim 6 in which the ethylenically unsaturated material comprises at least one ethylenically unsaturated monomer containing a plurality of ethylenically unsaturated groups.

8. A reinforced silicone elastomer as claimed in claim 1 in which cross-linking of the poly(organo-siloxane) is effected substantially to completion before commencement of polymerisation of the polymerisable ethylenically unsaturated material.

9. A reinforced silicone elastomer as claimed in claim 1 in which the poly(organo siloxane) comprises a plurality of hydroxyl groups and the cross-linking agent is an alkyl silicate or an alkyl polysilicate.

10. A reinforced silicone elastomer as claimed in claim 1 in which the poly(organo siloxane) comprises a pluraltiy of ethylenically unsaturated groups and the cross-linking agent is an alkyl hydrogeno polysiloxane.

11. A reinforced silicone elastomer as claimed in claim 1 in which in the composition the cross-linking agent is present in a proportion of 1% to 5% by weight of the poly(organo siloxane).

12. A reinforced silicone elastomer as claimed in claim 1 which comprises at least 10% by weight of polymeric material.

13. A reinforced silicone elastomer as claimed in claim 12 which comprises from 75% to 50% by weight of cross-linked silicone elastomer and from 25% to 50% by weight of polymeric material.

* * * * *